(12) United States Patent
Seo et al.

(10) Patent No.: US 10,614,798 B2
(45) Date of Patent: Apr. 7, 2020

(54) MEMORY COMPRESSION IN A DEEP NEURAL NETWORK

(71) Applicant: ARIZONA BOARD OF REGENTS ON BEHALF OF ARIZONA STATE UNIVERSITY, Scottsdale, AZ (US)

(72) Inventors: Jae-sun Seo, Tempe, AZ (US); Deepak Kadetotad, Tempe, AZ (US); Sairam Arunachalam, Tempe, AZ (US); Chaitali Chakrabarti, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 16/321,097

(22) PCT Filed: Jul. 27, 2017

(86) PCT No.: PCT/US2017/044065
§ 371 (c)(1),
(2) Date: Jan. 28, 2019

(87) PCT Pub. No.: WO2018/022821
PCT Pub. Date: Feb. 1, 2018

(65) Prior Publication Data
US 2019/0164538 A1  May 30, 2019

Related U.S. Application Data

(60) Provisional application No. 62/368,365, filed on Jul. 29, 2016.

(51) Int. Cl.
*G10L 15/16* (2006.01)
*G06N 3/063* (2006.01)
(Continued)

(52) U.S. Cl.
CPC ............ *G10L 15/16* (2013.01); *G06K 9/6267* (2013.01); *G06N 3/0472* (2013.01); *G06N 3/063* (2013.01);
(Continued)

(58) Field of Classification Search
CPC ....... G10L 15/16; G10L 15/285; G10L 25/30; G10L 17/18
See application file for complete search history.

(56) References Cited

U.S. PATENT DOCUMENTS 8,694,449 B2 * 4/2014 Weng ................. G06N 3/08
706/15
9,262,724 B2 * 2/2016 Kingsbury ............ G06N 20/00
(Continued)

FOREIGN PATENT DOCUMENTS

WO    2017190089 A1    11/2017
WO    2018057749 A1    3/2018

OTHER PUBLICATIONS

Han et al., "Deep Compression: Compressing Deep Neural Networks With Pruning, Trained Quantization and Huffman Coding", Stanford University, ICLR 2016, Feb. 2016, pp. 14 (Year: 2016).*
(Continued)

*Primary Examiner* — Kamran Afshar
*Assistant Examiner* — Urmana Islam
(74) *Attorney, Agent, or Firm* — Withrow & Terranova, P.L.L.C.

(57) ABSTRACT

Aspects disclosed in the detailed description include memory compression in a deep neural network (DNN). To support a DNN application, a fully connected weight matrix associated with a hidden layer(s) of the DNN is divided into a plurality of weight blocks to generate a weight block matrix with a first number of rows and a second number of columns. A selected number of weight blocks are randomly
(Continued)

designated as active weight blocks in each of the first number of rows and updated exclusively during DNN training. The weight block matrix is compressed to generate a sparsified weight block matrix including exclusively active weight blocks. The second number of columns is compressed to reduce memory footprint and computation power, while the first number of rows is retained to maintain accuracy of the DNN, thus providing the DNN in an efficient hardware implementation without sacrificing accuracy of the DNN application.

16 Claims, 10 Drawing Sheets

(51) Int. Cl.
    *G10L 15/22*     (2006.01)
    *G06K 9/62*     (2006.01)
    *G06N 3/04*     (2006.01)
    *G10L 15/28*     (2013.01)

(52) U.S. Cl.
    CPC ............ *G10L 15/22* (2013.01); *G10L 15/285* (2013.01); *G10L 2015/223* (2013.01)

(56) References Cited

U.S. PATENT DOCUMENTS

| | | | |
|---|---|---|---|
| 9,466,362 | B2 | 10/2016 | Yu et al. |
| 9,934,463 | B2 | 4/2018 | Seo et al. |
| 2010/0257129 | A1 | 10/2010 | Lyon et al. |
| 2013/0091081 | A1 | 4/2013 | He et al. |
| 2014/0229158 | A1 | 8/2014 | Zweig et al. |
| 2015/0324686 | A1 | 11/2015 | Julian et al. |
| 2016/0117587 | A1 | 4/2016 | Yan et al. |
| 2016/0247061 | A1* | 8/2016 | Trask ........................ G06N 3/04 |
| 2017/0300815 | A1 | 10/2017 | Seo |
| 2019/0080755 | A1 | 3/2019 | Seo et al. |
| 2019/0087719 | A1 | 3/2019 | Seo et al. |
| 2019/0150794 | A1 | 5/2019 | Vrudhula et al. |
| 2019/0244100 | A1 | 8/2019 | Seo et al. |

OTHER PUBLICATIONS

Han et al., "EIE: Efficient Inference Engine on Compressed Deep Neural Network", Stanford University, NVIDIA, May 2016, pp. 12 (Year: 2016).*
John et al., "Single- and Multi-level Network Sparsification by Algebraic Distance", Clemson University, Jan. 2016, pp. 29 (Year: 2016).*
Sainath, Tara, and Carolina Parada. "Convolutional neural networks for small-footprint keyword spotting." (2015).pp. 1-5. (Year: 2015).*
Sainath, Tara N., Brian Kingsbury, Vikas Sindhwani, Ebru Arisoy, and Bhuvana Ramabhadran. "Low-rank matrix factorization for deep neural network training with high-dimensional output targets." In 2013 IEEE international conference on acoustics, speech and signal processing, pp. 6655-6659. IEEE, 2013. (Year: 2.*
International Preliminary Report on Patentability for International Patent Application No. PCT/US2017/044065, dated Feb. 7, 2019, 7 pages.
International Search Report and Written Opinion for International Patent Application No. PCT/US2017/044065, dated Oct. 26, 2017, 10 pages.
Han, Song, et al., "Deep Compression: Compressing Deep Neural Networks with Pruning, Trained Quantization and Huffman Coding," International Conference on Learning Representations, Oct. 2015, 14 pages.
Venkataramani, Swagath, et al., "AxNN: Energy-Efficient Neuromorphic Systems Using Approximate Computing," International Symposium on Low Power Electronics and Design, Aug. 2014, ACM, pp. 27-32.
Bradley, A.P., "The Use of the Area Under the ROC Curve in the Evaluation of Machine Learning Algorithms," Pattern Recognition, vol. 30, No. 7, 1997, Elsevier Science Ltd., pp. 1145-1159.
Canning, A. et al., "Partially connected models of neural networks," Journal of Physics A: Mathematical and General, vol. 21, 1988, IOP Publishing Ltd., pp. 3275-3284.
Courbariaux, M. et al., "BinaryConnect: Training Deep Neural Networks with binary weights during propagations," Proceedings of the 28th International Conference on Neural Information Processing Systems (NIPS'15), vol. 2, Dec. 2015, MIT Press, 9 pages.
Deng, L. et al., "New Types of Deep Neural Network Learning for Speech Recognition and Related Applications: An Overview," 2013 IEEE International Conference on Acoustics, Speech and Signal Processing (ICCASP 2013), May 26-31, 2013, Vancouver, BC, Canada, IEEE, pp. 8599-8603.
Deng, L. et al., "Recent Advances in Deep Learning for Speech Research at Microsoft," 2013 IEEE International Conference on Acoustics, Speech and Signal Processing (ICCASP 2013), May 26-31, 2013, Vancouver, BC, Canada, IEEE, pp. 8604-8608.
Gardner, W.A., "Learning Characteristics of Stochastic-Gradient-Descent Algorithms: A General Study, Analysis, and Critique," Signal Processing, vol. 6, No. 2, Apr. 1984, Elsevier Science Publishers B.V., pp. 113-133.
Graves, A. et al., "Speech Recognition with Deep Recurrent Neural Networks," 2013 IEEE International Conference on Acoustics, Speech and Signal Processing (ICCASP 2013), May 26-31, 2013, Vancouver, BC, Canada, IEEE, pp. 6645-6649.
Gupta, S. et al., ""Deep Learning with Limited Numerical Precision,"" Proceedings of the 32nd International Conference on MachineLearning, JMLR: W&CP vol. 37, 2015, Lille, France, 10 pages.
He, T. et al., "Reshaping Deep Neural Network for Fast Decoding by Node-Pruning," 2014 IEEE International Conference on Acoustic, Speech and Signal Processing (ICASSP), May 4-9, 2014, Florence, Italy, IEEE, pp. 245-249.
Miao, Y., "Kaldi+PDNN: Building DNN-based ASR Systems with Kaldi and PDNN," arXiv:1401.6984v1 [cs.LG], Jan. 27, 2014, 4 pages.
Povey, D. et al., "The Kaldi Speech Recognition Toolkit," IEEE 2011 Workshop on Automatic Speech Recognition and Understanding, Dec. 2011, IEEE, 4 pages.
Price, P. et al., "The DARPA 1000-Word Resource Management Database for Continuous Speech Recognition," International Conference on Acoustics, Speech, and Signal Processing (ICASSP-88), Apr. 11-14, 1988, New York, NY, IEEE, pp. 651-654.
Rath, S.P. et al., "Improved feature processing for Deep Neural Networks," 14th Annual Conference of the International Speech Communication Association (Interspeech 2013), Aug. 25-29, 2013, Lyon, France, ISCA, 5 pages.
Rohlicek, J.R. et al., "Continuous Hidden Markov Modeling for Speaker-Independent Word Spotting," International Conference on Acoustics, Speech, and Signal Processing (ICASSP), May 23-26, 1989, Glasgow, UK, IEEE, pp. 627-630.
Sainath, T.N., "Convolutional Neural Networks for Small-footprint Keyword Spotting," 16th Annual Conference of the International Speech Communication Association (Interspeech 2015), Sep. 6-10, 2015, Dresden, Germany, 5 pages.
Shah, M. et al., "A Fixed-Point Neural Network for Keyword Detection on Resource Constrained Hardware," 2015 IEEE Workshop on Signal Processing Systems (SiPS), Oct. 14-16, 2015, Hangzhou, China, IEEE, 6 pages.
Su, D. et al., "GMM-HMM Acoustic Model Training by a Two Level Procedure with Gaussian Components Determined by Automatic Model Selection," 2010 IEEE International Conference on Acoustics, Speech and Signal Processing (ICASSP), Mar. 14-19, 2010, Dallas, TX, USA, IEEE, pp. 4890-4893.
Wan, L. et al., "Regularization of Neural Networks using DropConnect," Proceedings of the 30th International Conference on Machine Learning, JMLR: W&CP vol. 28, 2013, Atlanta, Georgia, USA, 12 pages.
Wilpon, J.G. et al., "Improvements and Applications for Key Word Recognition Using Hidden Markov Modeling Techniques," Pro-

(56) References Cited

OTHER PUBLICATIONS ceedings of the International Conference on Acoustics, Speech, and Signal Processing (ICASSP 91), Apr. 14-17, 1991, Toronto, Ontario, Canada, IEEE, pp. 309-312.

Yu, D. et al., "Automatic Speech Recognition: A Deep Learning Approach," London: Springer-Verlag, 2015, 329 pages.

* cited by examiner

MEMORY COMPRESSION IN A DEEP NEURAL NETWORK

RELATED APPLICATIONS

This application is a 35 USC 371 national phase filing of PCT/US17/44065, filed Jul. 27, 2017, which claims the benefit of U.S. Provisional Patent Application Ser. No. 62/368,365, filed Jul. 29, 2016, the disclosures of which are hereby incorporated herein by reference in their entireties.

FIELD OF THE DISCLOSURE

The technology of the disclosure relates generally to a deep neural network (DNN).

BACKGROUND

Automatic speech recognition (ASR), which converts words spoken by a person into readable text, has been a popular area of research and development for the past decades. The goal of ASR is to allow a machine to understand continuous speech in real time with high accuracy, independent of speaker characteristics, noise, or temporal variations. Nowadays, ASR technology can be easily found in a number of products, including Google Now (Google), Siri (Apple), and Echo (Amazon). In these ASR systems, speech recognition is activated by specific keywords such as "Okay Google," "Hey Siri," and "Alexa." Many of the ASR systems perform such wake-up keyword detection tasks in an always-on mode, always listening to surrounding acoustics without a dedicated start control. Minimizing power consumption of such always-on operations that can detect multiple keywords is crucial for mobile and wearable devices. The speech recognition task that follows keyword detection is much more computation and memory intensive such that it is typically offloaded to the cloud. In fact, a number of commercially available systems do not allow speech recognition if the device is not connected to the Internet. To expand the usage scenarios for mobile and wearable devices, it is important that the speech recognition engine has low hardware complexity and operates with a low-power budget.

One of the widely used approaches for speech recognition employs a hidden Markov model (HMM) for modeling the sequence of words/phonemes and uses a Gaussian mixture model (GMM) for acoustic modeling. The most likely sequence can be determined from the HMMs by employing the Viterbi algorithm. For keyword detection, a separate GMM-HMM could be trained for each keyword, while the out-of-vocabulary (OOV) words are modeled using a garbage or filler model. In recent years, employing deep neural networks (DNNs) in conjunction with HMM models for keyword detection and speech recognition have shown substantial improvements in classification accuracy. Other prior works in ASR featured recurrent neural networks or convolutional neural networks.

SUMMARY

Aspects disclosed in the detailed description include memory compression in a deep neural network (DNN). To support a DNN application (e.g., keyword detection and speech recognition), a fully connected weight matrix associated with a hidden layer(s) of the DNN is divided into a plurality of weight blocks of a determined block size appropriate for the DNN application to generate a weight block matrix with a first number of rows and a second number of columns. A selected number of weight blocks are randomly designated as active weight blocks in each of the first number of rows based on a target sparsity ratio appropriate for the selected application and updated exclusively during DNN training. The weight block matrix is compressed to generate a sparsified weight block matrix including exclusively the active weight blocks. In this regard, the second number of columns in the weight block matrix is compressed to reduce memory footprint and computation power, while the first number of rows in the weight block matrix is retained to maintain accuracy of the DNN. In addition, it may be possible to further reduce the memory requirement by reducing weight precision in the sparsified weight block matrix. As a result, it is possible support the DNN in an efficient hardware implementation (e.g., mobile and wearable devices) without sacrificing accuracy of the DNN application.

In one aspect, a method for reducing memory requirement of a DNN is provided. The method includes dividing a fully connected weight matrix associated with at least one hidden layer of the DNN into a plurality of weight blocks of a determined block size to generate a weight block matrix having a first number of rows and a second number of columns. The method also includes randomly designating a selected number of active weight blocks in each of the first number of rows based on a target sparsity ratio. The method also includes updating exclusively the selected number of active weight blocks in each of the first number of rows during a DNN training for a DNN application. The method also includes compressing the weight block matrix to generate a sparsified weight block matrix comprising exclusively the selected number of active weight blocks in each of the first number of rows during the DNN training. The method also includes storing the sparsified weight block matrix for the DNN application upon completion of the DNN training. The sparsified weight block matrix is configured to be used directly for DNN classification.

In another aspect, a non-transitory computer-readable medium including software with instructions is provided. The software with instructions is configured to divide a fully connected weight matrix associated with at least one hidden layer of a DNN into a plurality of weight blocks of a determined block size to generate a weight block matrix having a first number of rows and a second number of columns. The software with instructions is also configured to randomly designate a selected number of active weight blocks in each of the first number of rows based on a target sparsity ratio. The software with instructions is also configured to update exclusively the selected number of active weight blocks in each of the first number of rows during a DNN training for a DNN application. The software with instructions is also configured to compress the weight block matrix to generate a sparsified weight block matrix comprising exclusively the selected number of active weight blocks in each of the first number of rows during the DNN training. The software with instructions is also configured to store the sparsified weight block matrix for the DNN application upon completion of the DNN training. The sparsified weight block matrix is configured to be used directly for DNN classification.

In another aspect, an electronic device configured to implement a DNN is provided. The electronic device includes one or more memory banks each configured to store a sparsified weight block matrix generated by a method. The method includes dividing a fully connected weight matrix associated with at least one hidden layer of the DNN into a plurality of weight blocks of a determined block size to generate a weight block matrix having a first number of rows and a second number of columns. The method also includes randomly designating a selected number of active weight blocks in each of the first number of rows based on a target sparsity ratio. The method also includes updating exclusively the selected number of active weight blocks in each of the first number of rows during a DNN training for a DNN application. The method also includes compressing the weight block matrix to generate the sparsified weight block matrix comprising exclusively the selected number of active weight blocks in each of the first number of rows during the DNN training. The method also includes storing the sparsified weight block matrix in a memory bank among the one or more memory banks for the DNN application upon completion of the DNN training. The sparsified weight block matrix is configured to be used directly for DNN classification. The electronic device also includes DNN computation circuitry coupled to the one or more memory banks. The DNN computation circuitry is configured to receive a plurality of neuron inputs from a hidden layer in the DNN. The DNN computation circuitry is also configured to retrieve a selected sparsified weight block matrix corresponding to the hidden layer from a selected memory bank among the one or more memory banks. The DNN computation circuitry is also configured to generate a neuron output based on the plurality of neuron inputs and the selected sparsified weight block matrix.

Those skilled in the art will appreciate the scope of the present disclosure and realize additional aspects thereof after reading the following detailed description in association with the accompanying drawings.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1B:
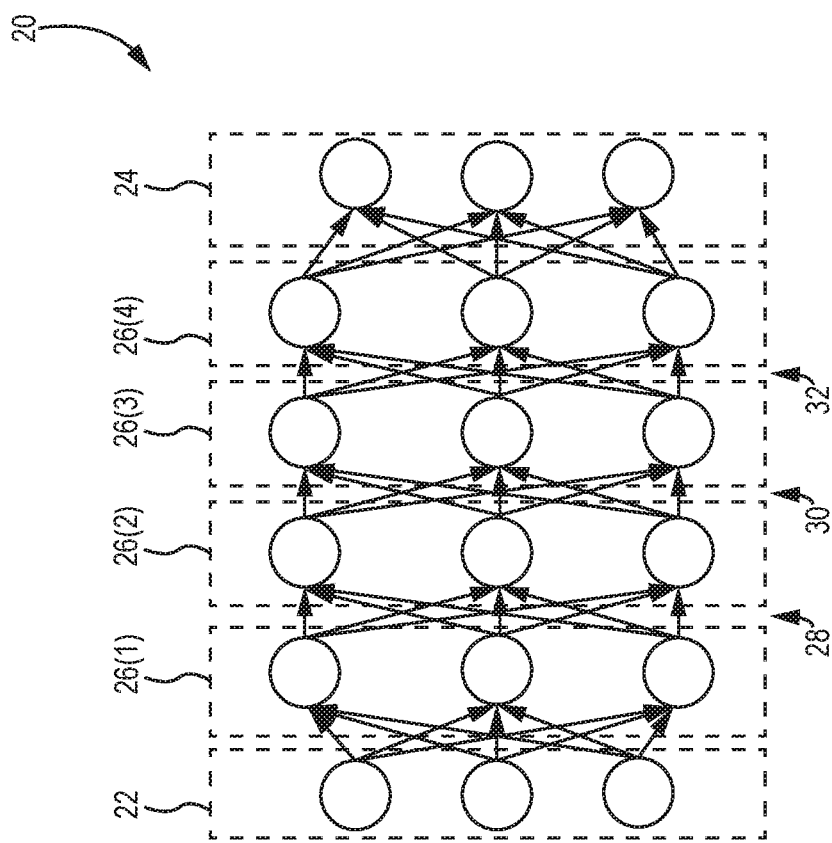
FIG. 1B is a schematic diagram of an exemplary DNN configured to support a speech recognition task.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below," "above," "upper," "lower," "horizontal," and/or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include memory compression in a deep neural network (DNN). To support a DNN application (e.g., keyword detection and speech recognition), a fully connected weight matrix associated with a hidden layer(s) of the DNN is divided into a plurality of weight blocks of a determined block size appropriate for the DNN application to generate a weight block matrix with a first number of rows and a second number of columns. A selected number of weight blocks are randomly designated as active weight blocks in each of the first number of rows based on a target sparsity ratio appropriate for the selected application and updated exclusively during DNN training. The weight block matrix is compressed to generate a sparsified weight block matrix including exclusively the active weight blocks. In this regard, the second number of columns in the weight block matrix is compressed to reduce memory footprint and computation power, while the first number of rows in the weight block matrix is retained to maintain accuracy of the DNN. In addition, it may be possible to further reduce the memory requirement by reducing weight precision in the sparsified weight block matrix. As a result, it is possible support the DNN in an efficient hardware implementation (e.g., mobile and wearable devices) without sacrificing accuracy of the DNN application.

Figure 1A:
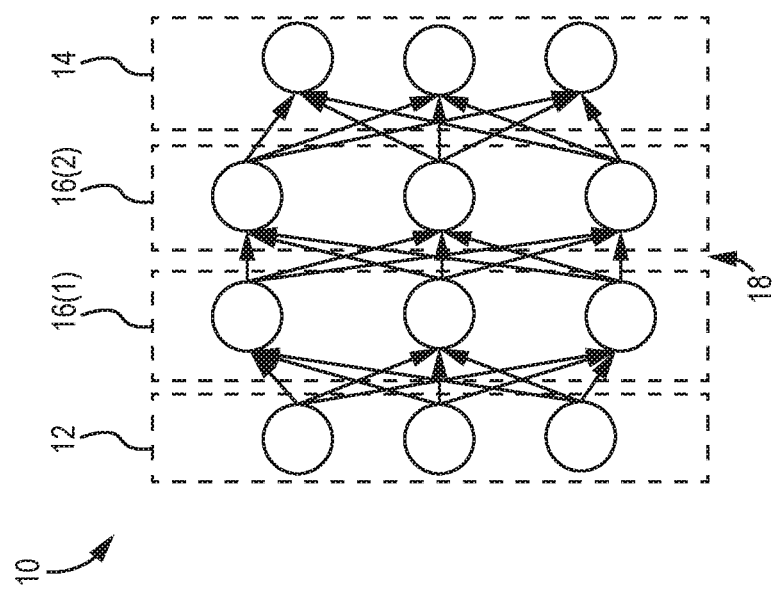
FIG. 1A is a schematic diagram of an exemplary deep neural network (DNN) configured to support a keyword detection task.

Before discussing exemplary aspects of memory compression in a DNN of the present disclosure, an overview of two separate DNNs designed to support keyword detection and speech recognition tasks is first provided with reference to FIGS. 1A and 1B. The discussion of specific exemplary aspects of memory compression in a DNN starts below with reference to FIG. 2.

FIG. 1A is a schematic diagram of an exemplary DNN 10 configured to support a keyword detection task. The DNN 10 includes an input layer 12, an output layer 14, and two hidden layers 16(1), 16(2) provided between the input layer 12 and the output layer 14. Each of the hidden layers 16(1), 16(2) includes five hundred twelve (512) neurons. Each of the 512 neurons in the hidden layer 16(1) is connected to each of the 512 neurons in the hidden layer 16(2) via a fully connected weight matrix 18 including 512×512 elements (weights). The input layer 12 includes four hundred three (403) input nodes corresponding to thirty-one (31) frames (fifteen previous frames, fifteen future frames, and one current frame) with thirteen (13) Mel frequency coefficients (MFCCs) per frame. The output layer 14 includes twelve (12) nodes, including ten (10) nodes for 10 selected keywords, respectively, one (1) node for out-of-vocabulary (OOV) words, and 1 node for silence. The output of the DNN 10 represents probability estimates by the 12 nodes in the output layer 14. These probability estimates are calculated using a softmax activation function.

FIG. 1B is a schematic diagram of an exemplary DNN 20 configured to support a speech recognition task. The DNN 20 includes an input layer 22, an output layer 24, and four hidden layers 26(1)-26(4). Each of the hidden layers 26(1)-26(4) includes one thousand twenty-four (1024) neurons. Each of the 1024 neurons in the hidden layer 26(1) is connected to each of the 1024 neurons in the hidden layer 26(2) via a first fully connected weight matrix 28 including 1024×1024 elements (weights). Likewise, each of the 1024 neurons in the hidden layer 26(2) is connected to each of the 1024 neurons in the hidden layer 26(3) via a second fully connected weight matrix 30, and each of the 1024 neurons in the hidden layer 26(3) is connected to each of the 1024 neurons in the hidden layer 26(4) via a third fully connected weight matrix 32.

The input layer 22 includes four hundred forty (440) input nodes corresponding to eleven (11) frames (five previous frames, five future frames, and one current frame) with forty (40) feature-space maximum likelihood linear regression (fMLLR) features per frame. The output layer 24 includes one thousand four hundred eighty-three (1483) probability estimates that are sent to a Hidden Markov Model (HMM) unit to determine the best sequence of phonemes. The transcription of the words and sentences for a particular set of phonemes is done using Kaldi toolkit.

Although it has been demonstrated that the DNN 10 and the DNN 20 can provide enhanced accuracy in keyword detection and speech recognition algorithms, respectively, actual implementation of the DNN 10 and the DNN 20 in hardware requires a large memory footprint and high computation power, due to the large number of parameters (e.g., hundreds of thousands for keyword detection and millions for speech recognition) associated with the keyword detection and speech recognition algorithms. A majority of the memory demands by the DNN 10 and the DNN 20 come from the need to store the fully connected weight matrix 18 for the DNN 10, and to store the first fully connected weight matrix 28, the second fully connected weight matrix 30, and the third fully connected weight matrix 32 for the DNN 20. For example, to achieve a 1.64% word error rate (WER) in speech recognition, it can take up to 19.53 Megabytes (MB) to store the first fully connected weight matrix 28, the second fully connected weight matrix 30, and the third fully connected weight matrix 32 for the DNN 20 when each of the 1024×1024 elements in the first fully connected weight matrix 28, the second fully connected weight matrix 30, and the third fully connected weight matrix 32 is presented with floating-point precision. Such high memory demand makes it difficult for mobile and wearable devices, which have constraints on embedded memory and computation resources, to support the DNN 10 and/or the DNN 20 for keyword detection and/or speech recognition, especially when the mobile and wearable devices are unable to offload such computation and memory intensive tasks to the cloud. Thus, it may be desired to reduce the number of weights between hidden layers 16(1), 16(2) in the DNN 10 and the hidden layers 26(1)-26(4) of the DNN 20 for efficient hardware implementation, without affecting accuracy of the keyword detection and the speech recognition tasks.

A number of prior solutions exist in weight memory reduction for the DNN 10 and the DNN 20, including weight and node pruning, fixed-point representation, selective weight approximation, and quantized weight sharing with Huffman coding. Most of these approaches reduce or drop weights on an element-by-element basis, which prevents efficient mapping onto hardware memory arrays. This is because the address information of which elements are dropped needs to be stored as indexes, which can offset the savings achieved from the reduced number of weights. As such, it may be desired to reduce the memory requirement for storing the indexes in addition to reducing the memory requirements for storing the weight matrices.

Figure 2:
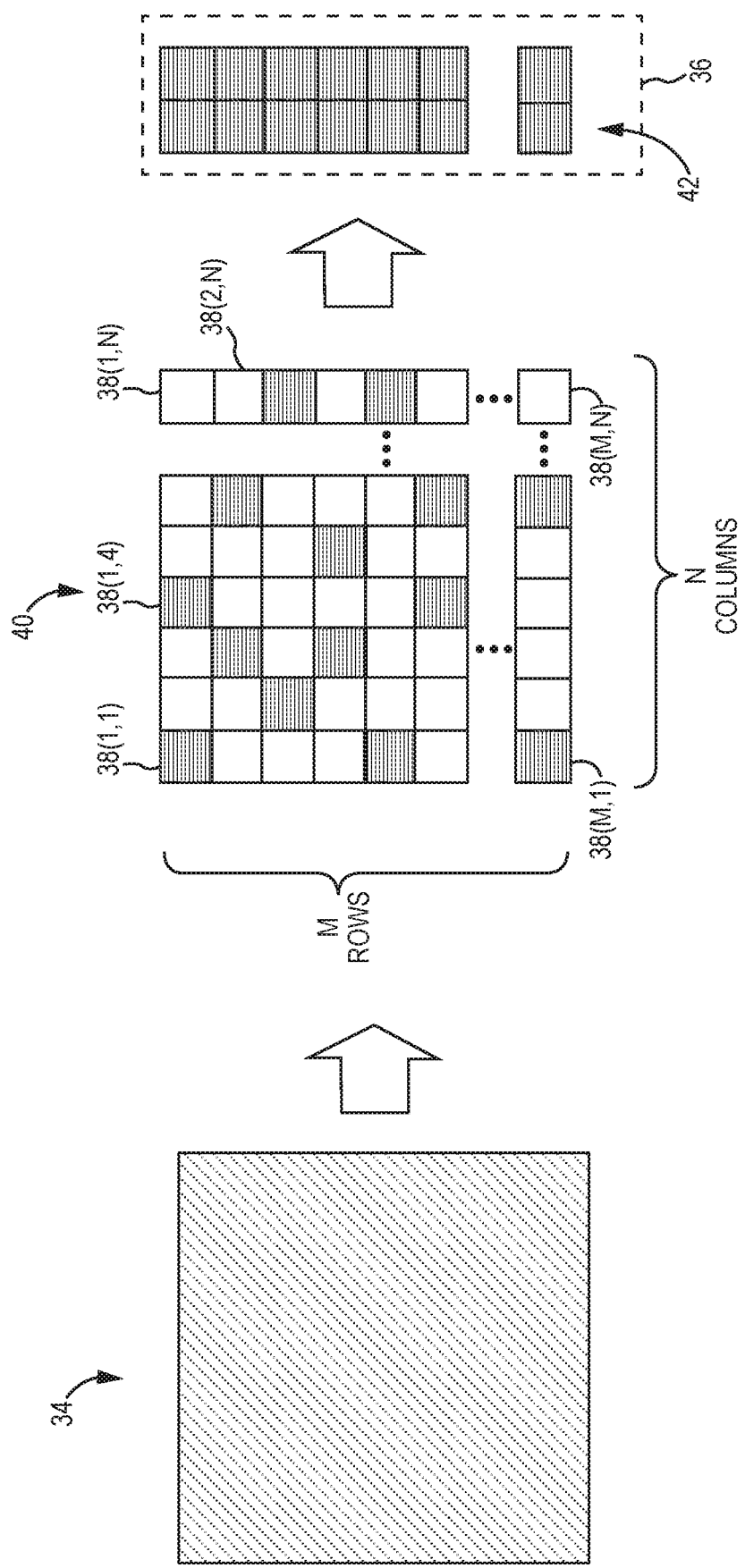
FIG. 2 is a schematic diagram of an exemplary fully connected weight matrix that is compressed based on a coarse-grain sparsification (CGS) method to enable efficient compression of weight memory in an application specific integrated circuit (ASIC)

In this regard, FIG. 2 is a schematic diagram of an exemplary fully connected weight matrix 34 that is compressed based on a coarse-grain sparsification (CGS) method to enable efficient compression of weight memory in an application specific integrated circuit (ASIC) 36. The key idea of the CGS method is to divide the fully connected weight matrix 34, which can be any of the fully connected weight matrix 18 of FIG. 1A, the first fully connected weight matrix 28, the second fully connected weight matrix 30, and the third fully connected weight matrix 32 of FIG. 1B, into a plurality of weight blocks 38(1,1)-38(M,N) to generate a weight block matrix 40. In this regard, the weight block matrix 40 is an M×N weight block matrix including a first number (M) of rows and a second number (N) of columns, wherein M can be equal to or different from N. Each of the weight blocks 38(1,1)-38(M,N) has a determined block size (e.g., 8×16, 16×32, 64×64, etc.).

In each of the M rows of the weight block matrix 40, a selected number of weight blocks are randomly designated as active weight blocks based on a target sparsity ratio. For example, if the target sparsity ratio is chosen to be 75%, then 25% of the weight blocks in each of the M rows would be designated as active weight blocks (also referred to as non-zero weight blocks), while 75% of the weight blocks in each of the M rows are inactive weight blocks (also referred to as zero weight blocks). In this regard, the target sparsity ratio determines dropping probability of the weight blocks in the weight block matrix 40, and thus can be referred to as a dropping probability ratio as well. In one example, the selected number of active weight blocks can be randomly designated based on a pseudo-random algorithm, as opposed to being based on a pure-random algorithm.

Throughout the entire process of DNN training for a DNN only the selected number of active weight blocks in each of the M rows is updated, while the inactive weight blocks remain at zero. After completing the DNN training, the weight block matrix 40 is compressed to generate a sparsified weight block matrix 42 that includes exclusively the selected number of active weight blocks in each of the M rows of the weight block matrix 40. In this regard, the sparsified weight block matrix 42 contains only 25% of the weight blocks of the weight block matrix 40 according to the 75% target sparsity ratio, while 75% of the weight blocks in the weight block matrix 40 are dropped. As a result, the sparsified weight block matrix 42 has a much smaller memory footprint than the fully connected weight matrix 34, thus allowing the sparsified weight block matrix 42 to be stored in the ASIC 36 for the DNN application(s).

In addition, since the fully connected weight matrix 34 is compressed into the sparsified weight block matrix 42 on a block-by-block basis, it is only necessary to index the selected number of active weight blocks (e.g., 25%) in the weight block matrix 40. In other words, only a weight block index identifying each of the selected number of active weight blocks in the sparsified weight block matrix 42 needs to be generated and stored with the sparsified weight block matrix 42. As such, memory footprint associated with storing the index would be significantly smaller compared to the memory footprint required for storing the index generated by the prior element-by-element based compression methods. For example, a 512×512 weight matrix compressed based on the prior element-by-element based compression methods requires approximately 589,824 bits in indexes, while the sparsified weight block matrix 42 generated via the CGS method only requires ninety-six (96) bits in index, which is a 99.98% reduction in index memory footprint.

Furthermore, it may be possible to further reduce the memory footprint of the sparsified weight block matrix 42 by performing DNN classification directly on the sparsified weight block matrix 42. In this regard, the DNN classification is performed by reducing precision of the weights in each of the selected number of active weight blocks in the weight block matrix 40. In a non-limiting example, the precision of the weights can be reduced for DNN classification from a floating-point precision to a fixed-point precision upon completing the DNN training for the weight block matrix 40. More specifically, it is possible to first quantize the weights with floating-point neurons down to the precision where the DNN accuracy is acceptable. Then, the DNN may be operated with reduced precision on the weights and choose reduced precision for the neurons, while still achieving acceptable accuracy. This methodology most likely leads to a higher precision for the neurons compared to that of the weights, but this is an acceptable trade-off since weights have a larger impact on the overall memory footprint as well as power consumption. Hereinafter, the fixed-point precision is denoted using a QA.B format, where A denotes the number of bits assigned to the integer part, and B denotes the number of bits assigned to the fractional part. Unless mentioned otherwise, an additional sign bit is assumed.

In this regard, by converting the fully connected weight matrix 34 into the weight block matrix 40 and compressing the weight block matrix 40 on a block-by-block basis, it is possible to significantly reduce the memory footprint required for storing the sparsified weight block matrix 42. As such, the sparsified weight block matrix 42 can be stored in memory bank(s) embedded in the ASIC 36. As a result, it is possible to support such DNN applications as keyword detection and speech recognition in the ASIC 36 with reduced footprint, computation complexity, and power consumption, while maintaining desirable accuracy for the DNN applications.

Figure 3:
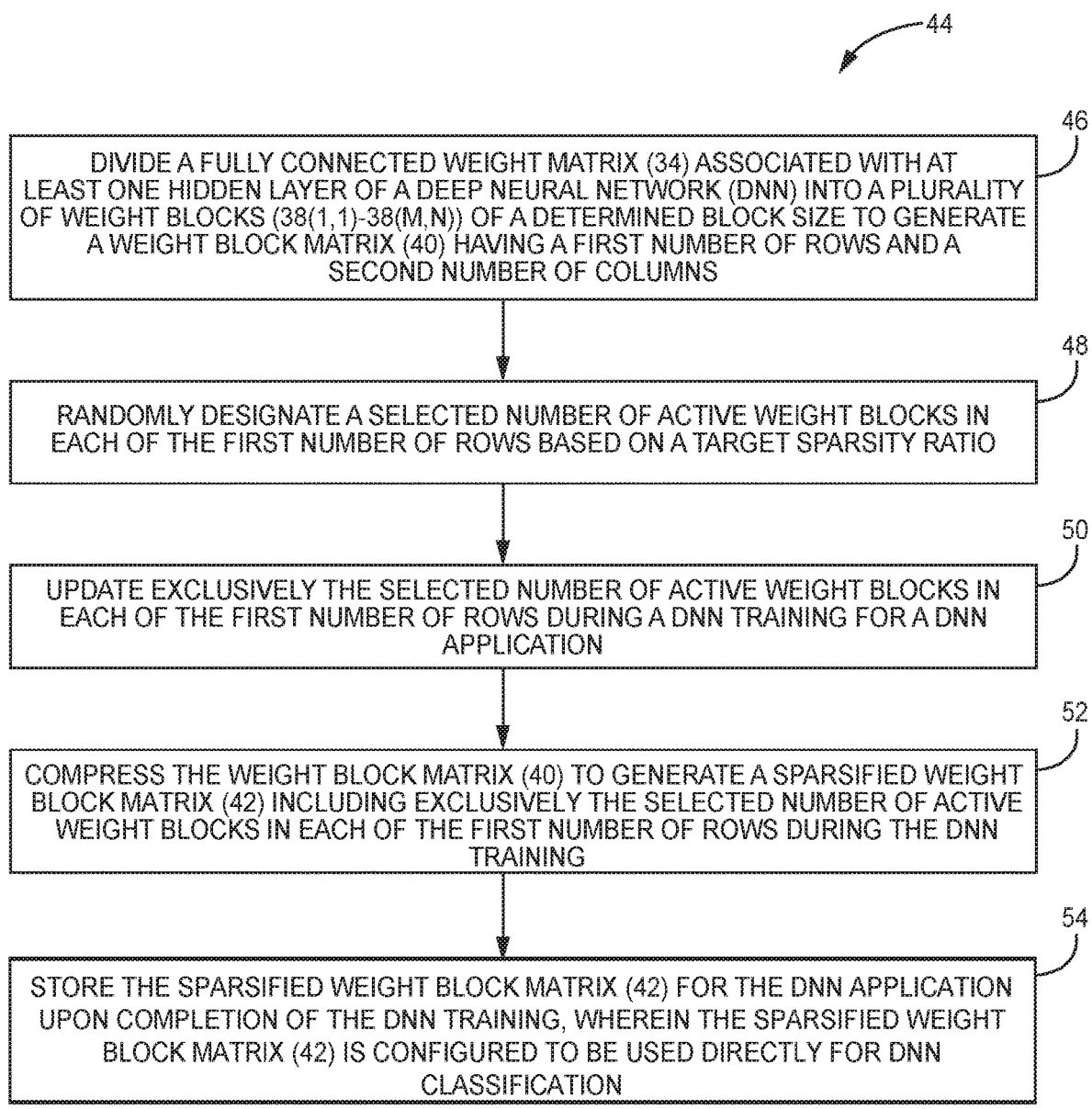
FIG. 3 is a flowchart of an exemplary process for implementing the CGS method of FIG. 2.

The CGS method as discussed above can be performed according to a process. In this regard, FIG. 3 is a flowchart of an exemplary process 44 for implementing the CGS method of FIG. 2. According to the process 44, the fully connected weight matrix 34 associated with at least one hidden layer of a DNN is first divided into the weight blocks 38(1,1)-38(M,N) of the determined block size to generate the weight block matrix 40 having M rows and N columns (block 46). A selected number of active weight blocks are randomly designated in each of the M rows based on the target sparsity ratio (block 48). The selected number of active weight blocks in each of the M rows is updated exclusively during the DNN training for the DNN application(s) (block 50). The weight block matrix 40 is compressed to generate the sparsified weight block matrix 42 that includes exclusively the selected number of active weight blocks in each of the M rows (block 52). The sparsified weight block matrix 42 is stored for the DNN application(s), wherein the sparsified weight block matrix 42 is configured to be used directly for DNN classification (block 54).

Figure 4:
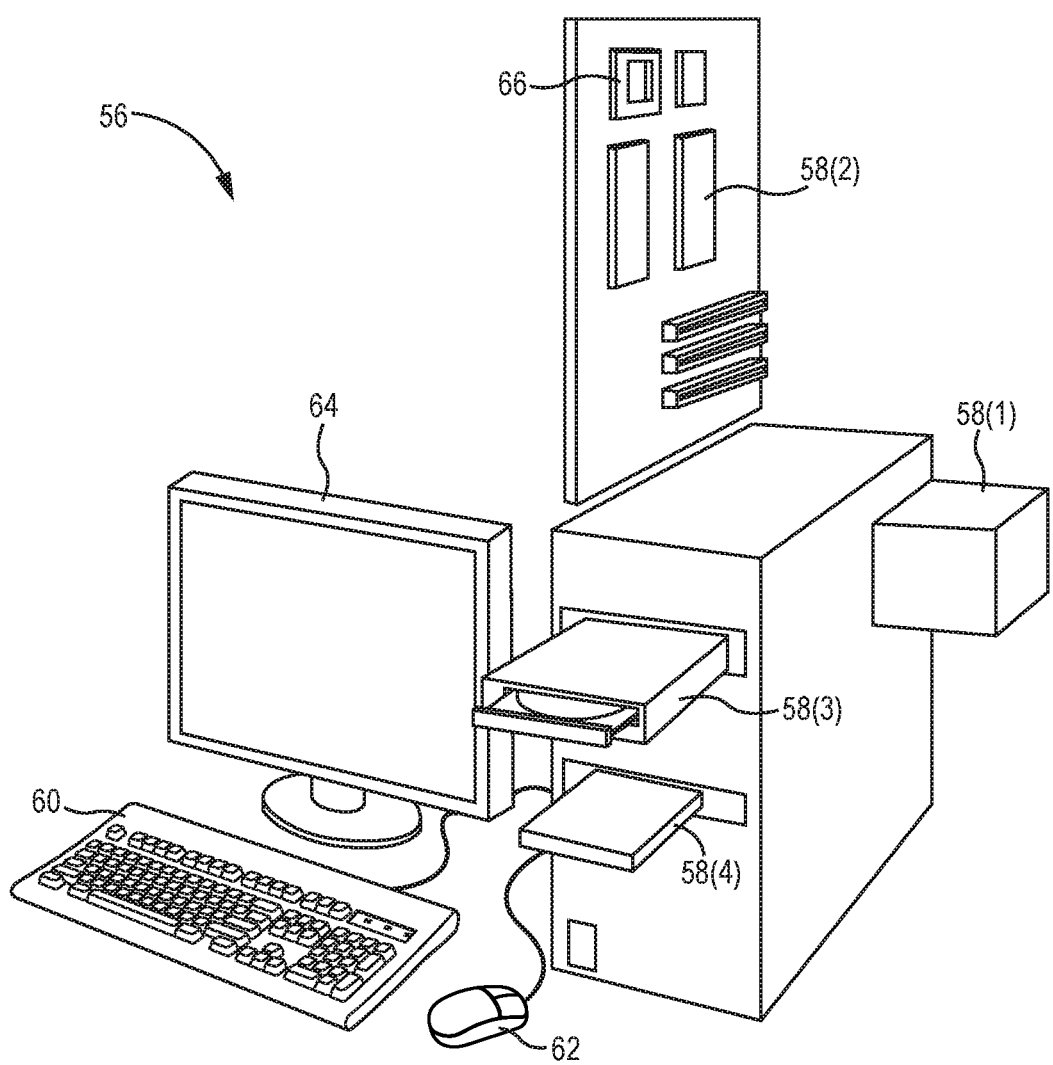
FIG. 4 is a schematic diagram of an exemplary computer system including one or more non-transitory computer-readable media for storing software instructions to implement the process of FIG. 3.

FIG. 4 is a schematic diagram of an exemplary computer system 56 including one or more non-transitory computer-readable media 58(1)-58(4) for storing software instructions to implement the process 44 of FIG. 3. Common elements between FIGS. 2, 3, and 4 are shown therein with common element numbers and will not be re-described herein.

The non-transitory computer-readable media 58(1)-58(4) further include a hard drive 58(1), an on-board memory system 58(2), a compact disc 58(3), and a floppy disk 58(4). Each of the non-transitory computer-readable media 58(1)-58(4) may be configured to store the software instructions to implement the process 44. The computer system 56 also includes a keyboard 60 and a computer mouse 62 for inputting the software instructions onto the non-transitory computer-readable media 58(1)-58(4). The keyboard 60 and the computer mouse 62 may also be used to input the initial system parameter of the process 44, which can be used to generate the fully connected weight matrix 34. The computer system 56 also includes a monitor 64 for outputting the sparsified weight block matrix 42 for storing in the ASIC 36 of FIG. 2. Further, the computer system 56 includes a processor 66 configured to read the software instructions from the non-transitory computer-readable media 58(1)-58(4) and execute the software instructions to implement the process 44. While the computer system 56 is illustrated as a single device, the computer system 56 may also be a computer network deployed according to a centralized topology or a distributed topology.

The CGS method of FIG. 2 and the process 44 of FIG. 3 can be used to reduce memory requirement for supporting keyword detection and speech recognition in the DNN 10 of FIG. 1A and the DNN 20 of FIG. 1B, respectively, as discussed next with reference to FIGS. 5A and 5B.

Figure 5A:
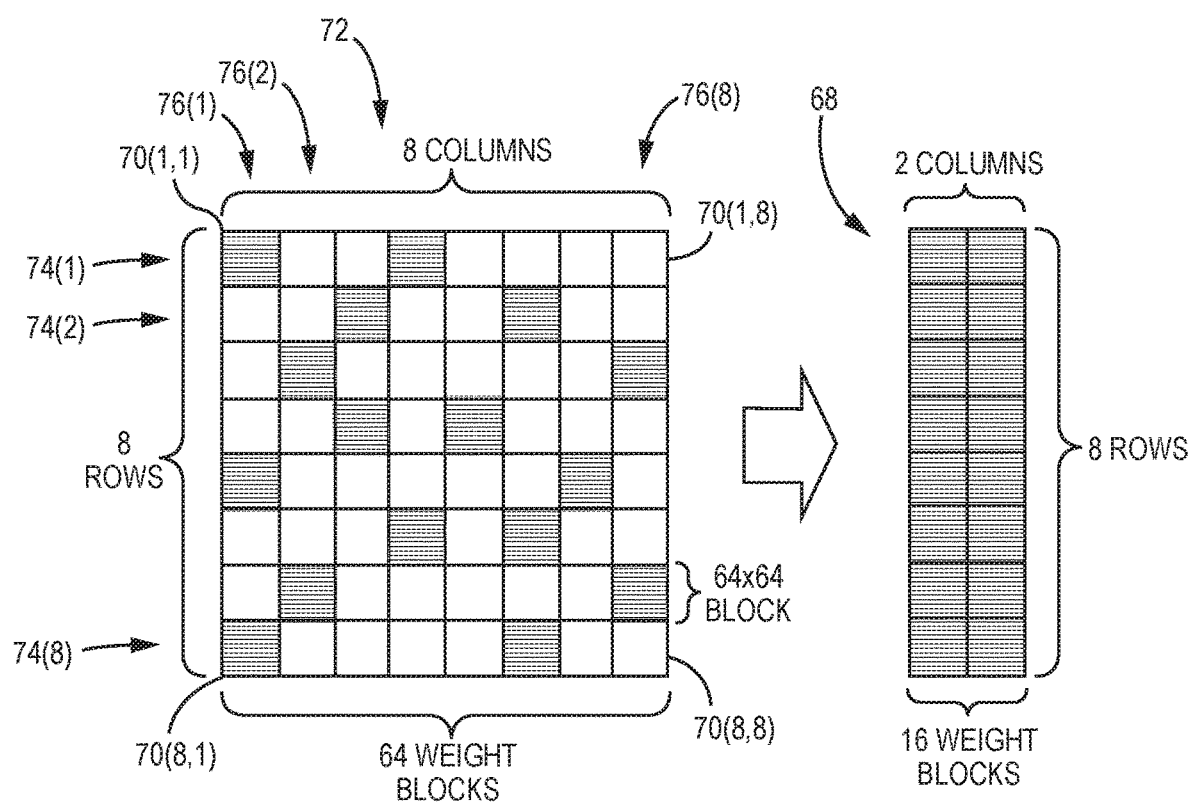
FIG. 5A is a schematic diagram of an exemplary sparsified weight block matrix that is generated based on the CGS method of FIG. 2 for reducing memory footprint of a fully connected weight matrix in the DNN of FIG. 1A for supporting the keyword detection task on the ASIC.

In this regard, FIG. 5A is a schematic diagram of an exemplary sparsified weight block matrix 68 that is generated based on the CGS method of FIG. 2 for reducing memory footprint of the fully connected weight matrix 18 in the DNN 10 of FIG. 1A for supporting the keyword detection task on the ASIC 36.

As discussed earlier in FIG. 1A, the fully connected weight matrix 18 includes 512×512 elements (weights). Through various experiments, it is determined that the keyword detection task performed by the DNN 10 can be achieved with desirable accuracy by selecting the determined block size to be 64×64 and selecting the target sparsity ratio to be 75%. Accordingly, the computer system 56 of FIG. 4, which is configured to carry out the CGS method according to the process 44 of FIG. 3, first divides the 512×512 elements in the fully connected weight matrix 18 into 64 weight blocks 70(1,1)-70(8,8) to generate a weight block matrix 72. The weight blocks 70(1,1)-70(8,8) are organized into eight rows 74(1)-74(8) (first number of rows) and eight columns 76(1)-76(8) (second number of columns). Accordingly, the weight block matrix 72 is formed as an 8×8 matrix having a total of 64 weight blocks.

The computer system 56 then randomly designates two active weight blocks in each of the rows 74(1)-74(8) according the 75% target sparsity ratio. During DNN training of the DNN 10, the computer system 56 updates exclusively the two active weight blocks in each of the rows 74(1)-74(8), while leaving other weight blocks at zero. Upon completion of the DNN training, the computer system 56 compresses the weight block matrix 72 to generate the sparsified weight block matrix 68 that includes exclusively the two active weight blocks in each of the rows 74(1)-74(8). As a result, the sparsified weight block matrix 68 includes each of the rows 74(1)-74(8), but only two of the columns 76(1)-76(8).

Accordingly, the sparsified weight block matrix 68 is formed as an 8×2 matrix including only 16 of the 64 (25% of the weight blocks from the weight block matrix 72).

Figure 5B:
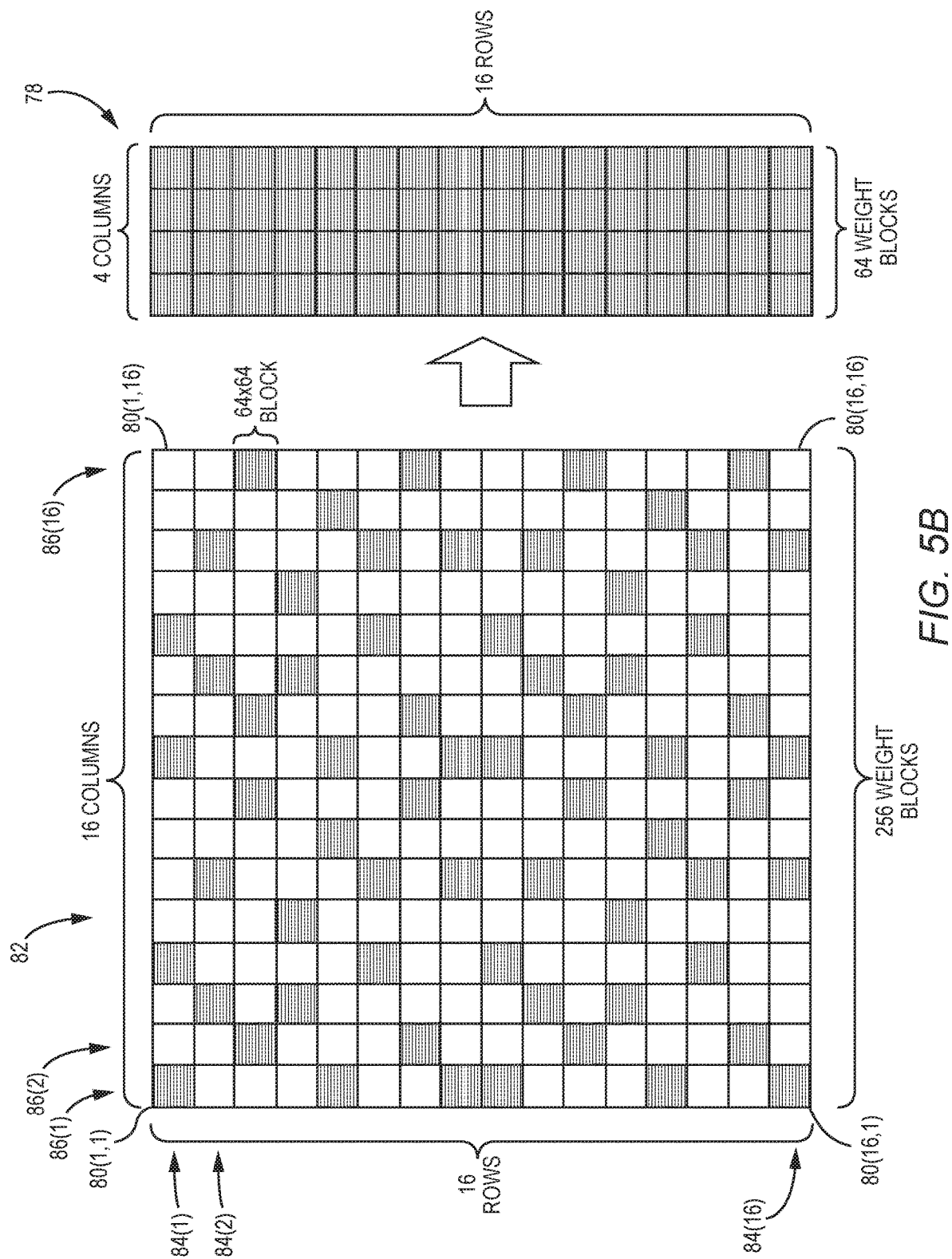
FIG. 5B is a schematic diagram of an exemplary sparsified weight block matrix that is generated based on the CGS method of FIG. 2 for reducing memory footprint of one or more fully connected weight matrices in the DNN of FIG. 1B for supporting the speech recognition task on the ASIC.

FIG. 5B is a schematic diagram of an exemplary sparsified weight block matrix 78 that is generated based on the CGS method of FIG. 2 for reducing memory footprint of the first fully connected weight matrix 28, the second fully connected weight matrix 30, and the third fully connected weight matrix 32 in the DNN 20 of FIG. 1B for supporting the speech recognition task on the ASIC 36.

As discussed earlier in FIG. 1B, the first fully connected weight matrix 28, the second fully connected weight matrix 30, and the third fully connected weight matrix 32 each includes 1024×1024 elements (weights). Through various experiments, it is determined that the speech recognition task performed by the DNN 20 can be achieved with desirable accuracy by selecting the determined block size to be 64×64 and the target sparsity ratio to be 75%. Accordingly, the computer system 56 of FIG. 4, which is configured to carry out the CGS method based on the process 44 of FIG. 3, first divides the 1024×1024 elements in any of the first fully connected weight matrix 28, the second fully connected weight matrix 30, and the third fully connected weight matrix 32 into 256 weight blocks 80(1,1)-80(16,16) to generate a weight block matrix 82. The weight blocks 80(1,1)-80(16,16) are organized into sixteen rows 84(1)-84(16) (first number of rows) and sixteen columns 86(1)-86(16) (second number of columns). Accordingly, the weight block matrix 82 is formed as a 16×16 matrix having a total of 256 weight blocks.

The computer system 56 then randomly designates four active weight blocks in each of the rows 84(1)-84(16) according to the 75% target sparsity ratio. During DNN training of the DNN 20 of FIG. 1B, the computer system 56 updates exclusively the four active weight blocks in each of the rows 84(1)-84(16), while leaving other weight blocks at zero. Upon completion of the DNN training, the computer system 56 compresses the weight block matrix 82 to generate the sparsified weight block matrix 78 that includes exclusively the four active weight blocks in each of the rows 84(1)-84(16). As a result, the sparsified weight block matrix 78 includes each of the rows 84(1)-84(16), but only four of the columns 86(1)-86(16). Accordingly, the sparsified weight block matrix 78 is formed as a 16×4 matrix including 64 of the 256 weight blocks from the weight block matrix 82.

To support the speech recognition task in the DNN 20, the first fully connected weight matrix 28, the second fully connected weight matrix 30, and the third fully connected weight matrix 32 are each compressed based on the process 44 into a respective sparsified weight block matrix. Accordingly, the computer system 56 repeats the process 44 for each of the first fully connected weight matrix 28, the second fully connected weight matrix 30, and the third fully connected weight matrix 32 to generate three sparsified weight block matrices.

Although only 25% of weights are retained in the sparsified weight block matrix 68 of FIG. 5A and the sparsified weight block matrix 78 of FIG. 5B, a group of multiplexers is required to select neurons and multiply the selected neurons with the existing weights since all neurons are available. For example, with a 64×64 block size, there are eight blocks in a row or a column, and two blocks will be designated as the active weight blocks. With a 32×32 block size, 16 blocks exist in each row or column, and four blocks will be designated as the active weight blocks. Different block sizes have been explored from 2×2 to 256×256 (with power of 2 numbers) that form a 512×512 (keyword detection) or 1024×1024 (speech recognition) fully connected weight matrix. Balancing the power/area overhead of additional control circuitries when using smaller block sizes and accuracy degradation using excessively large block sizes, the 64×64 block size was proven to be best suited for supporting the keyword detection task and the speech recognition task in the DNN 10 and the DNN 20, respectively. Although the CGS method discussed in FIGS. 5A and 5B is directed to supporting the keyword detection task and the speech recognition task, it should be appreciated that the CGS method described herein is also applicable for supporting other DNN applications, such as image recognition, video recognition, biomedical application, etc.

Before the DNN 10 of FIG. 1A and the DNN 20 of FIG. 1B can be utilized for the keyword detection task and the speech recognition task, respectively, it is necessary to first perform training and feed-forward classification for the DNN 10 and the DNN 20. Training of the DNN 10 and the DNN 20 involves minimizing cross-entropy error, as shown in the equation (Eq. 1) below.

$$E = -\sum_{i=1}^{N} t_i * \ln(y_i) \quad \text{(Eq. 1)}$$

In the equation (Eq. 1) above, N represents the size of an output layer. In this regard, in the DNN 10, N represents the number of outputs of the output layer 14, which equals 12. Likewise, in the DNN 20, N represents number of outputs of the output layer 24, which equals 1483. $y_i$ represents the ith output node in either the output layer 14 or the output layer 24. $t_i$ represents the ith target value or label of the ith output node. A mini-batch stochastic gradient method is used to train the DNN 10 and the DNN 20. A weight $W_{ij}$ is updated in the $(k+i)^{th}$ iteration, using the equation (Eq. 2) below.

$$(W_{ij})_{k+1} = (W_{ij})_k + C_{ij}*(-lr*(\Delta W_{ij})_k + m*(\Delta W_{ij})_{k-1}) \quad \text{(Eq. 2)}$$

In the equation (Eq. 2) above, m is the momentum and lr is the learning rate. $C_{ij}$ is a binary connection coefficient between two subsequent neural network layers, such as between the hidden layers 16(1), 16(2) in the DNN 10 or between the hidden layers 26(1)-26(4) in the DNN 20. $C_{ij}$ is a binary matrix indicating each non-zero weight and each zero weight in a fully connected weight matrix, such as the fully connected weight matrix 18 in the DNN 10 or any of the first fully connected weight matrix 28, the second fully connected weight matrix 30, and the third fully connected weight matrix 32 in the DNN 20. During the DNN training for the DNN 10 and the DNN 20, only the non-zero weight identified by $C_{ij}$ will be updated. In this regard, $C_{ij}$ ensures that only the weights present in the network (e.g., $C_{ij}$=1) are updated. The weight changes in each iteration can be seen as a differential of a cost function with respect to the weight value, as shown in the equation (Eq. 3) below.

$$\Delta W = \frac{\delta E}{\delta W} \quad \text{(Eq. 3)}$$

Once the DNN training is completed, feed-forward computations are performed in the DNN 10 and the DNN 20 as follows. For example, let the input layer 12 of the DNN 10 and the input layer 22 of the DNN 20 be denoted as $x_i$ (i=1, 2, . . . ), where N is the number of input features. For example, N equals 403 and 440 in the DNN 10 and the DNN 20, respectively. The computation in the first hidden layer $h^1$ is given as the equation (Eq. 4) below.

$$z_j^1 = \sum_{i=1}^{N} C_{ij} W_{ij}^1 x_i + b_j^1 \quad \text{(Eq. 4)}$$

In the equation (Eq. 4) above, z is the output neuron, W is the weight matrix, and b is the bias for the hidden layer. The non-linear function applied at the end of each hidden layer is rectified linear unit (ReLU) for both keyword detection and speech recognition.

Figure 6:
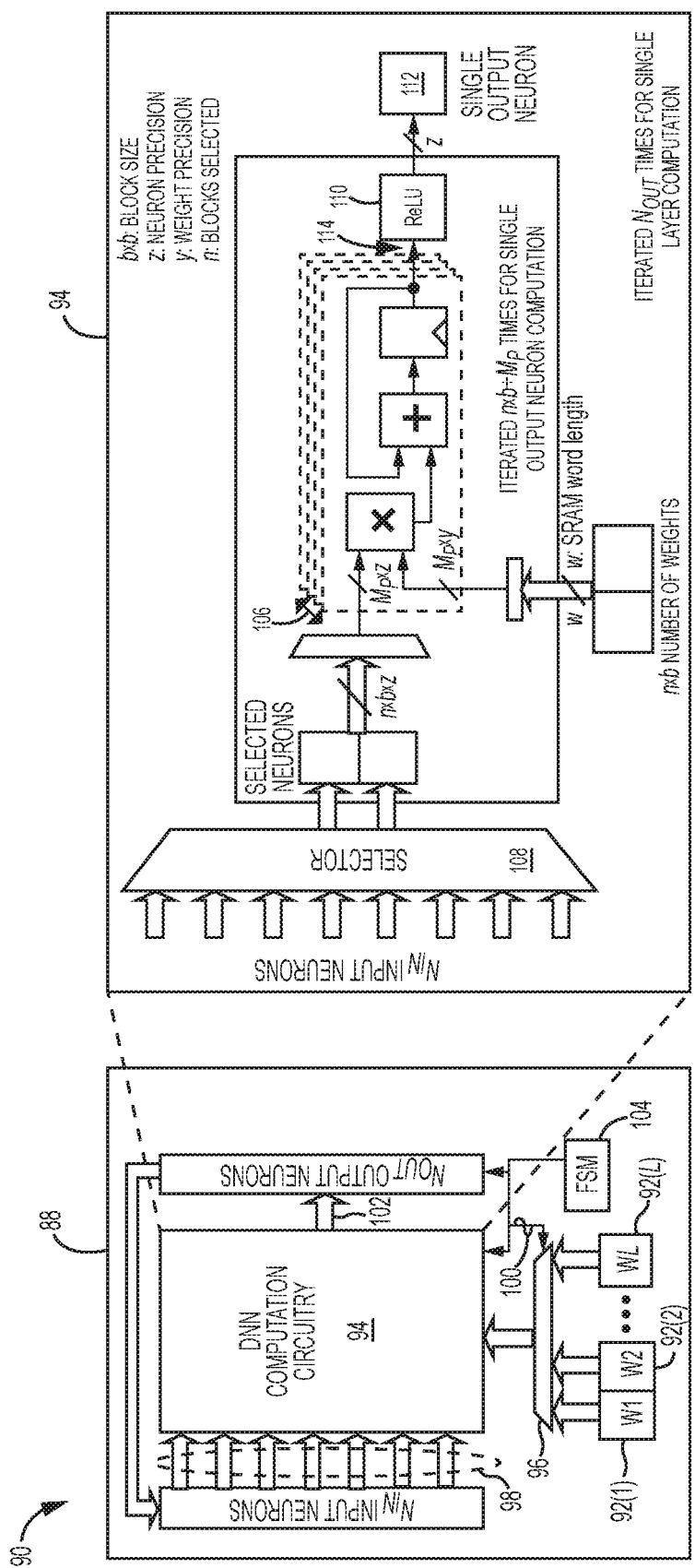
FIG. 6 is a schematic diagram of an exemplary ASIC configured to implement the DNN of FIG. 1A and/or the DNN of FIG. 1B to support the keyword detection task and/or the speech recognition task in an electronic device.

By reducing the memory footprint of the fully connected weight matrix 18 in the DNN 10 and each of the first fully connected weight matrix 28, the second fully connected weight matrix 30, and the third fully connected weight matrix 32 in the DNN 20 based on the process 44, it is possible to use the sparsified weight block matrix 68 of FIG. 5A and/or the sparsified weight block matrix 78 of FIG. 5B to support the keyword detection task and/or the speech recognition task in an electronic device(s), such as mobile devices or wearable devices. In this regard, FIG. 6 is a schematic diagram of an exemplary ASIC 88 configured to implement the DNN 10 of FIG. 1A and/or the DNN 20 of FIG. 1B to support the keyword detection task and/or the speech recognition task in an electronic device 90.

The ASIC 88 includes one or more memory banks 92(1)-92(L), which can be synchronous random access memory (SRAM) banks, for example. Each of the memory banks 92(1)-92(L) is configured to store a sparsified weight block matrix generated offline by the computer system 56 of FIG. 4 based on the process 44 of FIG. 3. To implement the DNN 10 of FIG. 1A to support the keyword detection task in the ASIC 88, one of the memory banks 92(1)-92(L) would be needed to store the sparsified weight block matrix 68 of FIG. 5A corresponding to the fully connected weight matrix 18. In contrast, to implement the DNN 20 of FIG. 1B to support the speech recognition task in the ASIC 88, three of the memory banks 92(1)-92(L) would be needed to store the three sparsified weight block matrices corresponding to the first fully connected weight matrix 28, the second fully connected weight matrix 30, and the third fully connected weight matrix 32.

The ASIC 88 also includes DNN computation circuitry 94 that is coupled to the memory banks 92(1)-92(L) via a multiplexer 96. The DNN computation circuitry 94 is configured to receive a plurality of neuron inputs 98 from a hidden layer in a DNN. For example, in the DNN 10, the DNN computation circuitry 94 would receive 512 neuron inputs from the hidden layer 16(1). Likewise, in the DNN 20, the DNN computation circuitry 94 would receive 1024 neuron inputs from each of the hidden layers 26(1)-26(4). The DNN computation circuitry 94 is also configured to retrieve a selected sparsified weight block matrix corresponding to the hidden layer in the DNN from a selected memory bank among the memory banks 92(1)-92(L). In a non-limiting example, the DNN computation circuitry 94 retrieves the selected sparsified weight block matrix via the multiplexer 96, which operates based on a selection signal 100. The DNN computation circuitry 94 thus generates a neuron output 102 based on the neuron inputs 98 and the selected sparsified weight block matrix.

The ASIC 88 may also include a controller 104, which can be a microprocessor, a microcontroller, or a field-programmable gate array (FPGA), for example. The controller 104 is configured to determine the selected sparsified weight block matrix corresponding to the hidden layer in the DNN based on a finite state machine (FSM). Accordingly, the controller 104 can generate the selection signal 100 indicating the selected memory bank storing the selected sparsified weight block matrix and provide the selection signal 100 to the multiplexer 96.

The DNN computation circuitry 94, which is further shown with more details on the right, operates on one layer in the DNN at a time. The DNN computation circuitry 94 includes $M_p$ multiply and accumulation (MAC) units 106 that operate in parallel on data forwarded by a selector 108. The DNN computation circuitry 94 can be reused to process multiple layers in the DNN 10 and/or the DNN 20. For example, the DNN computation circuitry 94 is reused for the hidden layers 16(1), 16(2) in FIG. 1A and the hidden layers 26(1)-26(4) in FIG. 1B. The FSM executed by the controller 104 coordinates data movement and reuse of the DNN computation circuitry 94 for the multiple layers in the DNN 10 and/or the DNN 20.

When the ASIC 88 is used to implement the DNN 10 for the keyword detection task, the input layer 12 includes 403 input neurons and the hidden layers 16(1), 16(2) each include 512 neurons. All of the neurons have sixteen bits (16-b) precision. According to previous discussions in FIG. 5A, the sparsified weight block matrix 68 used for the keyword detection task by the DNN 10 is an 8×2 matrix containing 16 weight blocks organized into 8 rows and 2 columns. Each of the 16 weight blocks corresponds to 64 of the 512 neurons in any of the hidden layers 16(1), 16(2). As such, for each of the 64 neurons, there are only 128 non-zero weights with 5-bit precision. The selector 108 chooses 2 weight blocks out of the 8 rows and directs the 2 selected weight blocks to the $M_p$ MAC units 106. Accordingly, the selector 108 is implemented using two eight-to-one (8:1) block multiplexers, each controlled by a 3-bit select signal. The 3-bit select signal contains spatial location of the weight blocks in the fully connected weight matrix 18 and is used to route data to the $M_p$ MAC units 106. For the keyword detection task performed by the DNN 10, the parameters in FIG. 6 are $N_{IN}$=512, b=64, z=16, and n=2.

The $M_p$ MAC units 106 operate on the selected sparsified weight block matrix, which contains stored weights, retrieved from the selected memory bank among the memory banks 92(1)-92(L) in conjunction with the neuron values corresponding to the weights in the selected sparsified weight block matrix. After investigating architectures with different numbers of the $M_p$ MAC units 106, it is determined that when $M_p$ equals 16, the $M_p$ MAC units 106 would consume the least amount of power. In this regard, for the keyword detection task, the $M_p$MAC units 106 compute 8 sum of products in parallel. After the sum of products computation is completed, a ReLU activation is performed at a ReLU unit 110, and then conveyed to an output neuron 112, which is a single neuron. An output 114 from the $M_p$ MAC units 106 is used as an input to the next layer's computations. The $M_p$ MAC units 106 would take 4096 cycles to compute on one layer for the keyword detection task in the DNN 10.

When the ASIC 88 is used to implement the DNN 20 for the speech recognition task, the input layer 22 includes 440 input neurons and the hidden layers 26(1)-26(4) each include 1024 neurons, all of which have 16-bit precision. The DNN 20 is trained to allow reuse of the DNN computation circuitry 94 for all the layers in the DNN 20. According to previous discussions in FIG. 5B, the sparsified weight block matrix 78 used for the speech recognition task by the DNN 20 is a 16×4 matrix containing 64 weight blocks organized into 16 rows and 4 columns. Each of the 64 weight blocks corresponds to 64 of the 1024 neurons in any of the hidden layers 26(1)-26(4). The selector 108 chooses 4 active weight blocks out of the 16 rows and directs the 4 selected active weight blocks to the $M_p$ MAC units 106. For the speech recognition task performed by the DNN 20, the parameters in FIG. 6 are $N_{IN}$=1024, b=64, z=16, and n=4.

The $M_p$ MAC units 106 operate on the selected sparsified weight block matrix, which contains stored weights, retrieved from the selected memory bank among the memory banks 92(1)-92(L) in conjunction with the neuron values corresponding to the weights in the selected sparsified weight block matrix. After investigating architectures with different numbers of the $M_p$ MAC units 106, it is determined that when $M_p$ equals 20, the $M_p$ MAC units 106 would consume the least amount of power for the speech recognition task. In this regard, for the speech recognition task, the $M_p$ MAC units 106 would take 13108 cycles to compute on one layer for the speech recognition task in the DNN 20.

The FSM executed on the controller 104 includes five and seven distinctive states for the keyword detection task and the speech recognition task, respectively. In state 0, all functional blocks in the DNN computation circuitry 94 are inactive as a sparsified weight block matrix(s) is loaded onto the memory banks 92(1)-92(L). Other states in the FSM control different steps of the computations of the DNN layers. For example, the FSM counts the number of total computations performed by the DNN computation circuitry 94 and feeds correct data to the DNN computation circuitry 94 accordingly.

The performance of the DNN 20 in supporting the speech recognition task can be measured by two key metrics, namely the word error rate (WER) and the sentence error rate (SER). The WER is described by WER=100*(S+D+I)/N, where S denotes the number of substitutions, D denotes the number of deletions, I denotes the number of insertions, and N denotes the number of words in the reference. The SER is the percentage of sentences with at least one error. The WER of the DNN 20 is discussed next with reference to FIG. 7.

Figure 7:
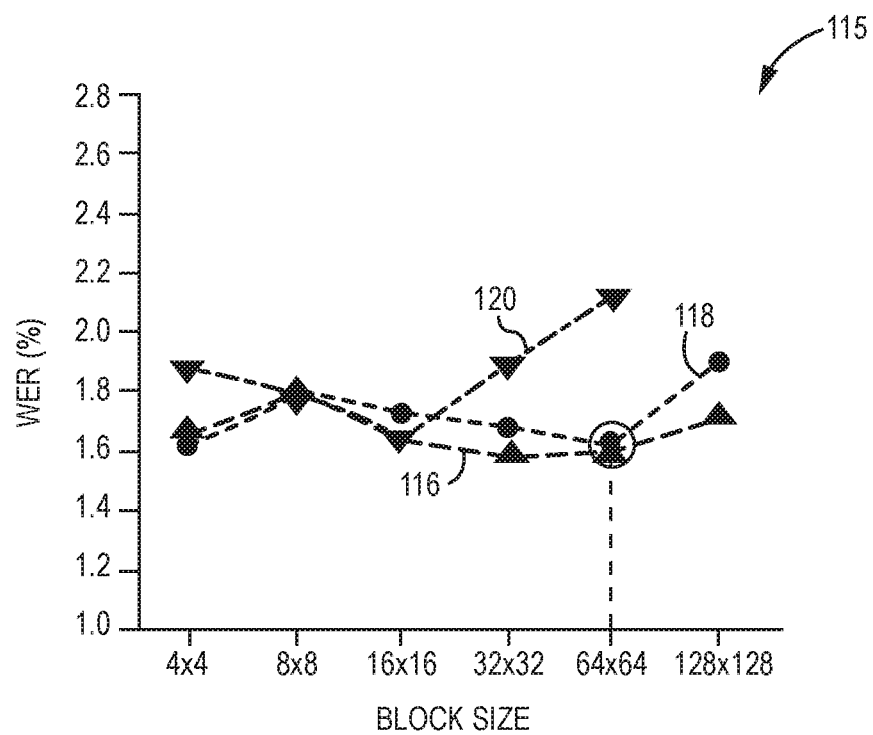
FIG. 7 is a graph providing exemplary illustrations on effects of different target sparsity ratios on word error rate (WER) with respect to the speech recognition task performed by the ASIC of FIG. 6.

FIG. 7 is a graph 115 providing exemplary illustrations on effects of different target sparsity ratios on the WER with respect to the speech recognition task performed by the ASIC 88 of FIG. 6. The graph 115 includes a first curve 116, a second curve 118, and a third curve 120 corresponding to 50%, 75%, and 87.5% target sparsity ratios, respectively. As shown in the graph 115, when the target sparsity ratio is up to 75%, the WER is at 1.6% when the determined block size for dividing any of the first fully connected weight matrix 28, the second fully connected weight matrix 30, and the third fully connected weight matrix 32 in the DNN 20 is 64×64. The 1.6% WER is comparable to the WER that can be achieved by the DNN 20 based on fully connected weight matrices with floating-point precision. Also, as shown by the third curve 120, increasing the target sparsity ration to 87.5% for block sizes larger than 64×64 would cause the WER to increase. As such, the target sparsity ratio and the determined block size for supporting the speech recognition task in the DNN 20 is determined to be 75% and 64×64, respectively.

Table 1 below provides a summary of WER and memory footprint comparison between the CGS method and conventional DNN architectures based on fully connected weight matrices.

TABLE 1

| Architecture | WER | Memory Footprint |
|---|---|---|
| Floating-Point (fully connected weight matrix) | 1.64% | 19.53 MB |
| Fixed-Point (fully connected weight matrix) | 1.77% | 3.66 MB |
| CGS Method (sparsified weight block matrix) | 1.67% | 1.02 MB |

As shown in Table 1, by using the sparsified weight block matrix 78 of FIG. 5B generated based on the process 44 of FIG. 3 in the speech recognition task, the WER of 1.67% is comparable to the 1.64% WER achieved based on a fully connected weight matrix, such as the first fully connected weight matrix 28, the second fully connected weight matrix 30, and the third fully connected weight matrix 32 in the DNN 20. However, by employing the CGS method to compress the fully connected weight matrix on a block-by-block basis, the memory footprint can be reduced from 19.53 MB to 1.02 MB. In this regard, the CGS method can help reduce the memory footprint by approximately 95%.

Figure 8:
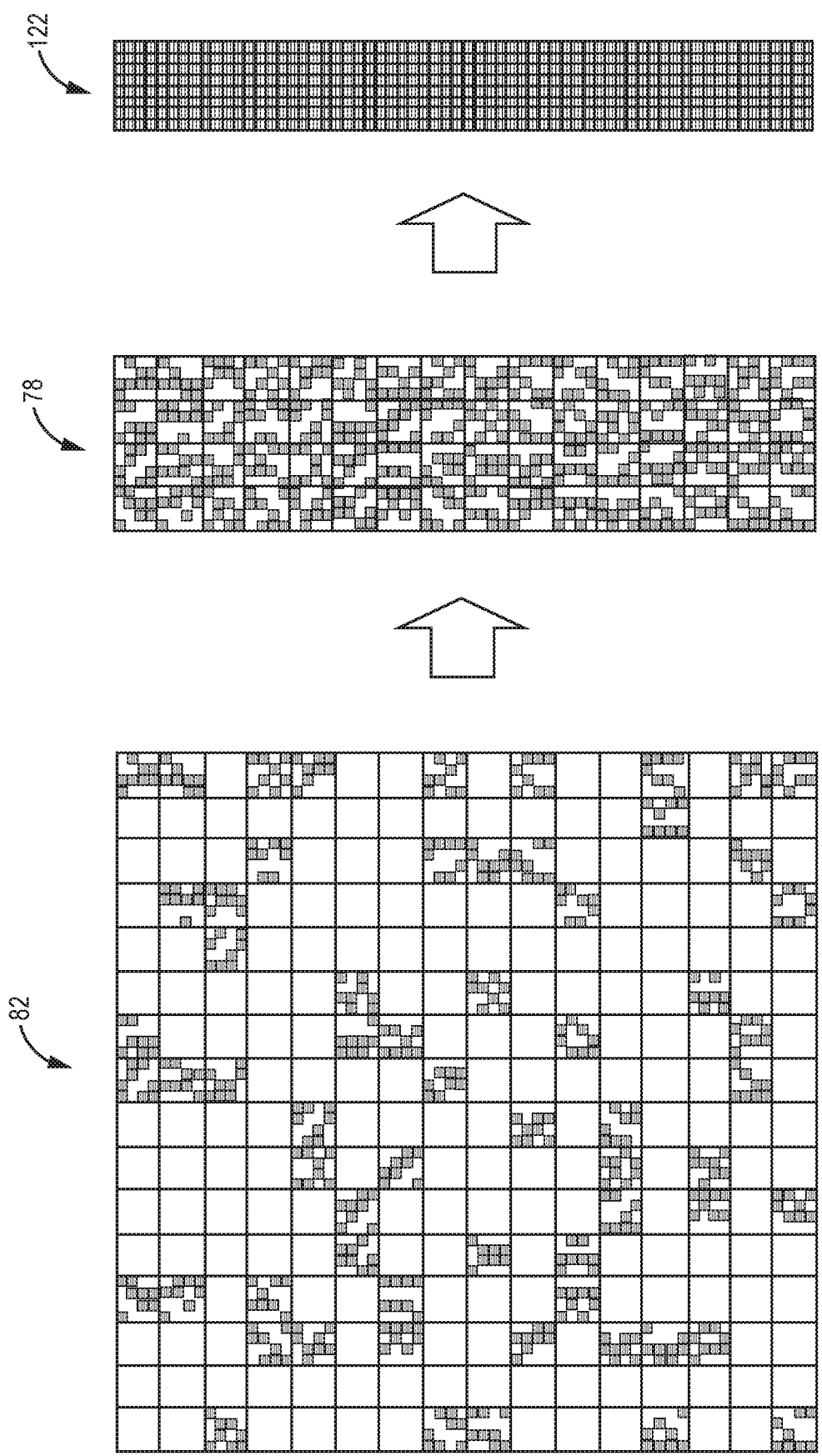
FIG. 8 is a schematic diagram of an exemplary hierarchical sparsified weight block matrix generated based on the sparsified weight block matrix of FIG. 5B according to a hierarchical CGS (HCGS) method for supporting the speech recognition task.

It may help to achieve greater sparsity in the sparsified weight block matrix 68 of FIG. 5A and the sparsified weight block matrix 78 of FIG. 5B with lower degradation of accuracy. In this regard, FIG. 8 is a schematic diagram of an exemplary hierarchical sparsified weight block matrix 122 generated based on the sparsified weight block matrix 78 of FIG. 5B according to a hierarchical CGS (HCGS) method for supporting the speech recognition task. Notably, although the HCGS method is discussed herein with respect to supporting the speech recognition task, the configuration and operation principles are applicable to the keyword detection task and other suitable DNN applications (e.g., image recognition, video recognition, biomedical application, etc.) as well. Common elements between FIGS. 5B and 8 are shown therein with common element numbers and will not be re-described herein.

According to previous discussions in FIG. 5B, the sparsified weight block matrix 78 generated based on the CGS method includes 64 64×64 weight blocks organized into 16 rows and 4 columns. The computer system 56 of FIG. 6 may be configured to perform at least one HCGS iteration based on the sparsified weight block matrix 78 to generate the hierarchical sparsified weight block matrix 122. In a non-limiting example, the computer system 56 is pre-configured to achieve an overall target sparsity ratio for a particular DNN application. Accordingly, the computer system 56 can be configured to perform a determined number of HCGS iterations until the overall target sparsity ratio is reached. During each of the determined number of HCGS iterations, the computer system 56 of FIG. 4 further divides each of the 64 64×64 weight blocks in the sparsified weight block matrix 78 into a plurality of HCGS weight blocks of a determined HCGS block size smaller than 64×64. Next, the computer system 56 randomly designates a selected number of active HCGS weight blocks in each of the 64 64×64 weight blocks in the sparsified weight block matrix 78 based on an HCGS target sparsity ratio. The HCGS target sparsity ratio can be greater than, equal to, or less than the target sparsity ratio. The computer system 56 then compresses the sparsified weight block matrix 78 to generate the hierarchical sparsified weight block matrix 122 by including exclusively the active HCGS weight blocks in each of the 64 64×64 weight blocks.

More specifically, the determined HCGS block size and the HCGS target sparsity ratio are chosen to be 16×16 and 50%, respectively. Accordingly, the computer system 56 divides each of the 64 64×64 weight blocks in the sparsified weight block matrix 78 into 16 16×16 weight blocks and randomly designates two active weight blocks in each of the 64 64×64 weight blocks in the sparsified weight block matrix 78. The computer system 56 then compresses the sparsified weight block matrix 78 to generate the hierarchical sparsified weight block matrix 122 including exclusively the two active 16×16 weight blocks. Accordingly, the hierarchical sparsified weight block matrix 122 has an overall target sparsity ratio of 87.5%.

The hierarchical sparsified weight block matrix 122 generated based on the HCGS method allows for structured sparsity that can enable easy and efficient compression of DNN parameters with minimal requirement of index information. In addition, for the speech recognition task, the hierarchical sparsified weight block matrix 122 generated based on the HCGS method can achieve approximately 50% reduction in the memory footprint compared to the sparsified weight block matrix 78 generated based on the CGS method. More importantly, the HCGS method can reduce the memory footprint without increasing the WER. In addition, only an HCGS weight block index for identifying the selected number of active HCGS weight blocks in each active weight block in the sparsified weight block matrix 78 needs to be generated and stored. Thus, the HCGS method can also help reduce the memory footprint for storing weight block indexes.

Figure 9:
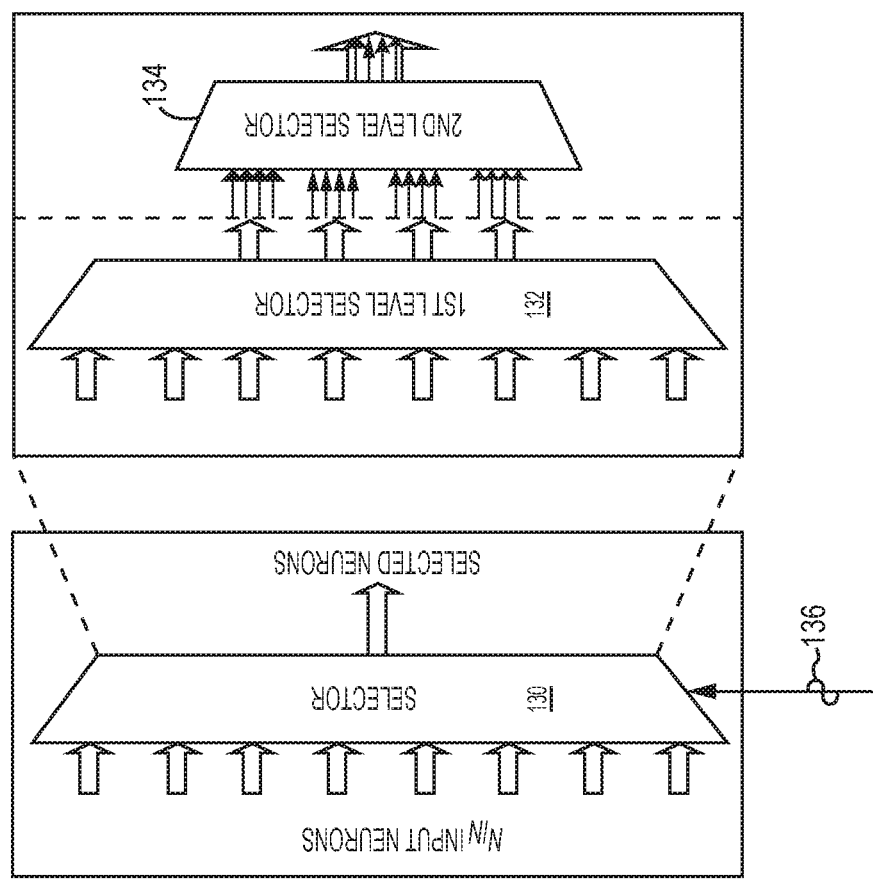
FIG. 9 is a schematic diagram of an exemplary multi-level selector that can be provided in the ASIC of FIG. 6 to support the HCGS method of FIG. 8.

The HCGS method can be supported in the ASIC 88 of FIG. 6 by adopting a multi-level selector. In this regard, FIG. 9 is a schematic diagram of an exemplary multi-level selector 130 that can be provided in the ASIC 88 of FIG. 6 to support the HCGS method of FIG. 8.

The multi-level selector 130 can be provided in the DNN computation circuitry 94 to replace the selector 108. The multi-level selector 130 includes at least one first level selector 132 and at least one second level selector 134. In a non-limiting example, the first level selector 132 can be configured to support such determined block size between 32×32 and 128×128, and the second level selector 134 can be configured to support such determined HCGS block size between 4×4 and 16×16. Thus, the multi-level selector 130 is capable of supporting the determined block size of 64×64 and the determined HCGS block size of 16×16, as described above in FIG. 8 with respect to the HCGS method.

The first level selector 132 and the second level selector 134 may be controlled by a select signal 136, which can be determined by the equations (Eq. 5 and Eq. 6) below.

$$S_{bits_n} = \log_2\left(\frac{N_{IN} \cdot p_{drop_{n-1}}}{b_n}\right) \quad \text{(Eq. 5)}$$

$$Index_{bits} = \sum_1^n S_{bits_n} \cdot \frac{N_{IN} \cdot N_{OUT}}{(b_n)^2} \cdot p_{drop_n} \quad \text{(Eq. 6)}$$

In the equations (Eq. 5 and Eq. 6) above, $S_{bits_n}$ represents width of the select signal 136 for $n^{th}$ level of a DNN. $N_{IN}$ represents the number of input neurons of a DNN layer, $N_{OUT}$ represents number of output neurons of the DNN layer, $P_{drop_n}$ represents the percentage of non-zero weights remaining at the $n^{th}$ level with regard to the original number of weights (zero and non-zero) ($P_{drop_o}=1$), $b_n$ represents block size of the $n^{th}$ level, and $Index_{bits}$ represents the total index bits required for a specific layer.

Those skilled in the art will recognize improvements and modifications to the present disclosure. All such improvements and modifications are considered within the scope of the concepts disclosed herein.

What is claimed is:

1. A method for reducing memory requirement of a deep neural network (DNN) comprising:
dividing a fully connected weight matrix associated with at least one hidden layer of the DNN into a plurality of weight blocks of a determined block size to generate a weight block matrix having a first number of rows and a second number of columns;
randomly designating a selected number of active weight blocks in each of the first number of rows based on a target sparsity ratio;
updating exclusively the selected number of active weight blocks in each of the first number of rows during a DNN training for a DNN application;
compressing the weight block matrix to generate a sparsified weight block matrix comprising exclusively the selected number of active weight blocks in each of the first number of rows during the DNN training;
storing the sparsified weight block matrix for the DNN application upon completion of the DNN training, wherein the sparsified weight block matrix is configured to be used directly for DNN classification; and
performing at least one hierarchical coarse-grain sparsification (HCGS) iteration based on the sparsified weight block matrix of the DNN;
wherein performing the at least one HCGS iteration comprises:
for each active weight block in the sparsified weight block matrix:
dividing the active weight block into a plurality of HCGS weight blocks of a determined HCGS block size smaller than the determined block size; and
randomly designating a selected number of active HCGS weight blocks based on an HCGS target sparsity ratio;
compressing the sparsified weight block matrix to generate a hierarchical sparsified weight block matrix comprising exclusively the selected number of active HCGS weight blocks in each active weight block in the sparsified weight block matrix;
generating an HCGS weight block index identifying the selected number of active HCGS weight blocks in each active weight block in the sparsified weight block matrix; and
storing the HCGS weight block index for the DNN application.

2. The method of claim 1 further comprising reducing precision of each weight in each of the selected number of active weight blocks from a floating-point precision to a fixed-point precision for the DNN classification.

3. The method of claim 1 further comprising:
generating a binary connection coefficient identifying each non-zero weight and each zero weight in each of the selected number of active weight blocks in each of the first number of rows; and
updating exclusively the non-zero weight identified by the binary connection coefficient during the DNN training.

4. The method of claim 1 further comprising:
generating a weight block index identifying each of the selected number of active weight blocks in the sparsified weight block matrix; and
storing the weight block index with the sparsified weight block matrix for the DNN application.

5. The method of claim 1 further comprising:
supporting a keyword detection task based on the DNN comprising an input layer, an output layer, and two hidden layers each having five hundred twelve (512) neurons;
dividing the fully connected weight matrix into sixty-four (64) 64-by-64 (64×64) weight blocks to generate the weight block matrix having eight rows and eight columns;
randomly designating two active 64×64 weight blocks in each of the eight rows;
updating the two active 64×64 weight blocks in each of the eight rows of the weight block matrix during the DNN training; and
compressing the weight block matrix to generate the sparsified weight block matrix comprising exclusively the two active 64×64 weight blocks in each of the eight rows of the weight block matrix.

6. The method of claim 1 further comprising:
supporting a speech recognition task based on the DNN comprising an input layer, an output layer, and four hidden layers each having one thousand twenty-four (1024) neurons;
dividing the fully connected weight matrix into two hundred fifty-six (256) sixty-four-by-sixty-four (64×64) weight blocks to generate the weight block matrix having sixteen rows and sixteen columns;
randomly designating four active 64×64 weight blocks in each of the sixteen rows;
updating the four active 64×64 weight blocks in each of the sixteen rows during the DNN training; and
compressing the weight block matrix to generate the sparsified weight block matrix comprising exclusively the four active 64×64 weight blocks in each of the sixteen rows of the weight block matrix.

7. The method of claim 6 further comprising:
for each active 64×64 weight block in the sparsified weight block matrix:
dividing the active 64×64 weight block into sixteen (16) 16-by-16 (16×16) weight blocks and organizing the 16 16×16 weight blocks into four rows and four columns; and
randomly designating two active 16×16 weight blocks in each of the four rows; and
compressing the sparsified weight block matrix to generate a hierarchical sparsified weight block matrix comprising exclusively the active 16×16 weight blocks.

8. A non-transitory computer-readable medium comprising software with instructions configured to:
divide a fully connected weight matrix associated with at least one hidden layer of a deep neural network (DNN) into a plurality of weight blocks of a determined block size to generate a weight block matrix having a first number of rows and a second number of columns;
randomly designate a selected number of active weight blocks in each of the first number of rows based on a target sparsity ratio;
update exclusively the selected number of active weight blocks in each of the first number of rows during a DNN training for a DNN application;
compress the weight block matrix to generate a sparsified weight block matrix comprising exclusively the selected number of active weight blocks in each of the first number of rows during the DNN training;

store the sparsified weight block matrix for the DNN application upon completion of the DNN training, wherein the sparsified weight block matrix is configured to be used directly for DNN classification; and perform at least one hierarchical coarse-grain sparsification (HCGS) iteration based on the sparsified weight block matrix, comprising:

for each active weight block in the sparsified weight block matrix:

dividing the active weight block into a plurality of HCGS weight blocks of a determined HCGS block size smaller than the determined block size; and randomly designating a selected number of active HCGS weight blocks based on an HCGS target sparsity ratio;

compressing the sparsified weight block matrix to generate a hierarchical sparsified weight block matrix comprising exclusively the selected number of active HCGS weight blocks in each active weight block in the sparsified weight block matrix;

generating an HCGS weight block index identifying the selected number of active HCGS weight blocks in each active weight block in the sparsified weight block matrix; and storing the HCGS weight block index for the DNN application.

9. The non-transitory computer-readable medium of claim 8 wherein the software with instructions is further configured to reduce precision of each weight in each of the selected number of active weight blocks from a floating-point precision to a fixed-point precision for the DNN classification.

10. The non-transitory computer-readable medium of claim 8 wherein the software with instructions is further configured to:

generate a binary connection coefficient identifying each non-zero weight and each zero weight in each of the selected number of active weight blocks in each of the first number of rows; and update exclusively the non-zero weight identified by the binary connection coefficient during the DNN training.

11. The non-transitory computer-readable medium of claim 8 wherein the software with instructions is further configured to:

generate a weight block index identifying each of the selected number of active weight blocks in the sparsified weight block matrix; and store the weight block index with the sparsified weight block matrix for the DNN application.

12. The non-transitory computer-readable medium of claim 8 wherein the software with instructions is further configured to:

support a keyword detection task based on the DNN comprising an input layer, an output layer, and two hidden layers each having five hundred twelve (512) neurons;

divide the fully connected weight matrix into sixty-four (64) 64-by-64 (64×64) weight blocks to generate the weight block matrix having eight rows and eight columns;

randomly designate two active 64×64 weight blocks in each of the eight rows;

update the two active 64×64 weight blocks in each of the eight rows of the weight block matrix during the DNN training; and compress the weight block matrix to generate the sparsified weight block matrix comprising exclusively the two active 64×64 weight blocks in each of the eight rows of the weight block matrix.

13. The non-transitory computer-readable medium of claim 8 wherein the software with instructions is further configured to:

support a speech recognition task based on the DNN comprising an input layer, an output layer, and four hidden layers each having one thousand twenty-four (1024) neurons;

divide the fully connected weight matrix into two hundred fifty-six (256) sixty-four-by-sixty-four (64×64) weight blocks to generate the weight block matrix having sixteen rows and sixteen columns;

randomly designate four active 64×64 weight blocks in each of the sixteen rows;

update the four active 64×64 weight blocks in each of the sixteen rows during the DNN training; and compress the weight block matrix to generate the sparsified weight block matrix comprising exclusively the four active 64×64 weight blocks in each of the sixteen rows of the weight block matrix.

14. The non-transitory computer-readable medium of claim 13 wherein the software with instructions is further configured to:

for each active 64×64 weight block in the sparsified weight block matrix:

divide the active 64×64 weight block into sixteen (16) 16-by-16 (16×16) weight blocks and organize the 16 16×16 weight blocks into four rows and four columns; and randomly designate two active 16×16 weight blocks in each of the four rows; and compress the sparsified weight block matrix to generate a hierarchical sparsified weight block matrix comprising exclusively the active 16×16 weight blocks.

15. An electronic device configured to implement a deep neural network (DNN) comprising:

one or more memory banks each configured to store a sparsified weight block matrix generated by a method comprising:

dividing a fully connected weight matrix associated with at least one hidden layer of the DNN into a plurality of weight blocks of a determined block size to generate a weight block matrix having a first number of rows and a second number of columns;

randomly designating a selected number of active weight blocks in each of the first number of rows based on a target sparsity ratio;

updating exclusively the selected number of active weight blocks in each of the first number of rows during a DNN training for a DNN application;

compressing the weight block matrix to generate the sparsified weight block matrix comprising exclusively the selected number of active weight blocks in each of the first number of rows during the DNN training;

storing the sparsified weight block matrix in a memory bank among the one or more memory banks for the DNN application upon completion of the DNN training, wherein the sparsified weight block matrix is configured to be used directly for DNN classification; and performing at least one hierarchical coarse-grain sparsification (HCGS) iteration based on the sparsified weight block matrix of the DNN;

wherein performing the at least one HCGS iteration comprises:
   for each active weight block in the sparsified weight block matrix:
      dividing the active weight block into a plurality of HCGS weight blocks of a determined HCGS block size smaller than the determined block size; and
      randomly designating a selected number of active HCGS weight blocks based on an HCGS target sparsity ratio;
   compressing the sparsified weight block matrix to generate a hierarchical sparsified weight block matrix comprising exclusively the selected number of active HCGS weight blocks in each active weight block in the sparsified weight block matrix;
   generating an HCGS weight block index identifying the selected number of active HCGS weight blocks in each active weight block in the sparsified weight block matrix; and
   storing the HCGS weight block index for the DNN application; and
DNN computation circuitry coupled to the one or more memory banks and configured to:
   receive a plurality of neuron inputs from a hidden layer in the DNN;
   retrieve a selected sparsified weight block matrix corresponding to the hidden layer from a selected memory bank among the one or more memory banks; and
   generate a neuron output based on the plurality of neuron inputs and the selected sparsified weight block matrix.

16. The electronic device of claim 15 further comprising a controller configured to:
   determine the selected sparsified weight block matrix corresponding to the hidden layer based on a finite state machine (FSM); and
   provide a selection signal indicating the selected memory bank storing the selected sparsified weight block matrix to the DNN computation circuitry.

\* \* \* \* \*